(No Model.)
O. LUND.
TOY RATTLE.
No. 594,178. Patented Nov. 23, 1897.
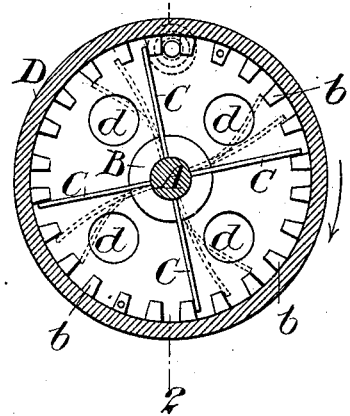
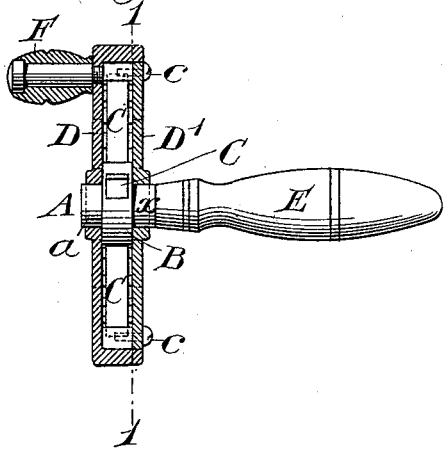
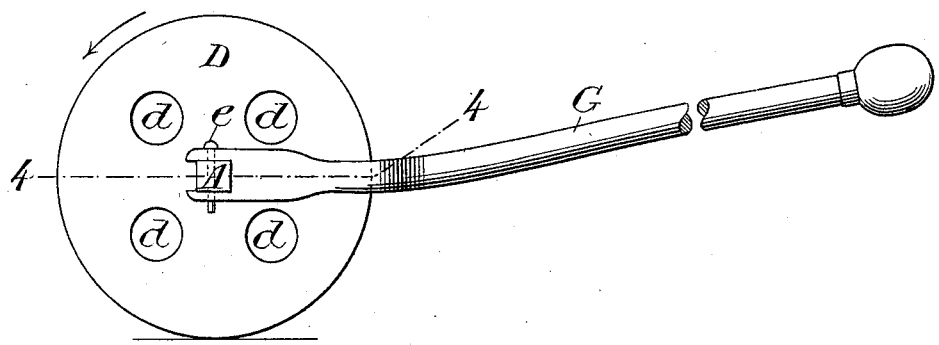
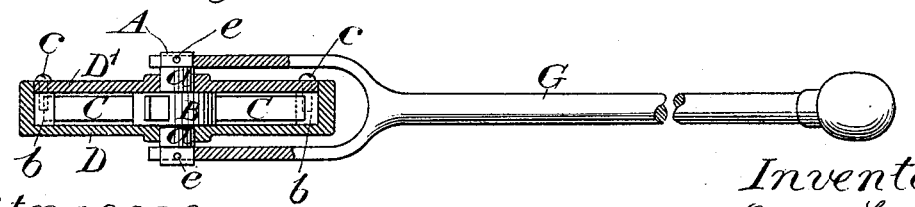
Witnesses:
M. E. Fletcher
Fred Haynes
Inventor
Oscar Lund
by attorneys
Brown & Seward
THE NORRIS PETERS CO., PHOTO-LITHO., WASHINGTON, D. C.

UNITED STATES PATENT OFFICE.

OSCAR LUND, OF BROOKLYN, NEW YORK.

TOY RATTLE.

SPECIFICATION forming part of Letters Patent No. 594,178, dated November 23, 1897.

Application filed March 1, 1897. Serial No. 625,555. (No model.)

*To all whom it may concern:*

Be it known that I, OSCAR LUND, of the city of Brooklyn, in the county of Kings and State of New York, have invented a new and useful Improvement in Toy Rattles, of which the following is a specification.

I will first describe my improvement with reference to the accompanying drawings and afterward point out its novelty in the claim.

Figures 1 and 2 of the drawings represent one example of my invention, Fig. 1 representing a section at right angles to Fig. 2 in the line 1 1 of the latter figure, and Fig. 2 being a view taken at right angles to Fig. 1 and showing parts of the rattle entire and parts in section on the line 2 2 of Fig. 1. Fig. 3 is a side view of another example of my invention, and Fig. 4 a horizontal section on the line 4 4 of Fig. 3.

Similar letters of reference designate corresponding parts in all the figures.

In all the figures, A designates an axle, on which is formed or firmly secured a hub B, in which are secured one or more springs or elastic wings C, projecting laterally from the axle.

D D' designate a circular box or shell which surrounds the axle, hub, and wings before mentioned and contains in its sides bearings for journals $a$, provided on the axle A on opposite sides of the hub. Within and all around the inner circumference of the box or shell D D', concentric with the axle A, there are provided a series of inwardly-projecting teeth $b$. The springs or wings C C are of such length that they will engage with the teeth $b$, as shown in bold outline in Fig. 1, but that in turning the axle A within the shell or turning the shell upon the axle the said wings or springs will, owing to their elasticity, yield, as indicated in dotted outline in Fig. 1, and so pass by the teeth or allow the teeth to pass by them, each wing or spring striking upon the tooth next behind that which it passes, thereby with a rapid rotation of the axle within the shell or the shell upon the axle producing a lively rattling noise.

The shell or box may be constructed in any suitable manner to provide for the insertion of the axle with its hub and wings or springs. It is represented as having the side D' removable and secured to the other parts—consisting of the other side, the surrounding rim, and the teeth—by means of screws $c$.

The shell D D' may entirely inclose the hub B and the springs or wings C; but I prefer to provide in one side, as shown in Figs. 1 and 3, openings $d\ d$ for the escape of the rattling sound, so arranging and proportioning such openings that they will conceal the teeth $b$, and to some extent the wings or springs C, from view.

In the example shown in Figs. 1 and 2 the axle A is firmly attached to the end of a handle E, which forms a direct longitudinal prolongation of it, and a crank-handle F is attached to the shell D D' for the purpose of turning the said shell with one hand while the handle is held in the other.

In the example shown in Figs. 3 and 4 the axle A is permanently secured to a forked handle G, the prongs of the forks of which embrace the shell and are secured to portions of the axle, which project from the shell in such manner as to prevent the axle from turning in the handle. The means for securing the axle to the handle consists in making the ends of the axle square, fitting the squared ends to slots in the ends of the fork, and inserting pins $e$ through the axle and the fork. This example of my invention is to be operated by pushing or placing the edge of the shell upon the ground, floor, or any suitable surface, holding the handle in the hand and then pushing or dragging the shell over the floor to produce its rotation.

This rattle may be made of any suitable material, but wood is perhaps preferable on account of its sonorous quality.

What I claim as my invention is—

A toy rattle comprising an axle, one or more elastic wings attached to and projecting laterally from said axle, a handle to which said axle is rigidly attached, and a circular shell fitted to rotate on said axle and provided around its inner circumference with teeth engaging with said wings, substantially as herein described.

OSCAR LUND.

Witnesses:
FREDK. HAYNES,
EDWARD VIESER.